(12) United States Patent
Getsch et al.

(10) Patent No.: US 7,716,637 B2
(45) Date of Patent: May 11, 2010

(54) EMBEDDED MACROS

(75) Inventors: Timothy E. Getsch, Redmond, WA (US); Michael Allen Brotherton, Mooresville, NC (US); Marcus E. Markiewicz, Mercer Island, WA (US); Andrew M. Warden, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1181 days.

(21) Appl. No.: 11/303,197

(22) Filed: Dec. 15, 2005

(65) Prior Publication Data

US 2007/0168977 A1 Jul. 19, 2007

(51) Int. Cl.
*G06F 9/44* (2006.01)
(52) U.S. Cl. ..................................................... 717/114
(58) Field of Classification Search ................. 717/114, 717/116
See application file for complete search history.

(56) References Cited

U.S. PATENT DOCUMENTS

| | | | | |
|---|---|---|---|---|
| 5,428,792 | A * | 6/1995 | Conner et al. | 717/143 |
| 5,883,623 | A * | 3/1999 | Cseri | 715/866 |
| 5,905,891 | A * | 5/1999 | Harada et al. | 717/146 |
| 6,104,872 | A | 8/2000 | Kubota et al. | 395/701 |
| 6,357,038 | B1 | 3/2002 | Scouten | 717/3 |
| 6,912,692 | B1 | 6/2005 | Pappas | 715/762 |
| 7,191,452 | B2 * | 3/2007 | Noden | 719/328 |
| 2002/0083422 | A1 | 6/2002 | Scouten | 717/140 |
| 2003/0097649 | A1 * | 5/2003 | Jones et al. | 717/115 |
| 2003/0110470 | A1 * | 6/2003 | Hanson et al. | 717/114 |
| 2003/0145310 | A1 * | 7/2003 | Thames et al. | 717/123 |
| 2003/0163801 | A1 * | 8/2003 | Thames et al. | 717/123 |
| 2003/0223526 | A1 * | 12/2003 | Sorna | 375/376 |
| 2004/0163073 | A1 * | 8/2004 | Krzyzanowski et al. | 717/107 |
| 2004/0179215 | A1 * | 9/2004 | Reese et al. | 358/1.11 |
| 2004/0268329 | A1 * | 12/2004 | Prakasam | 717/141 |
| 2005/0110652 | A1 | 5/2005 | Becker et al. | 340/825.72 |

OTHER PUBLICATIONS

Tratt "Compile-time meta-programming in a dynamically typed OO language", Sep. 1997, ACM, TICHI vol. 4, Issue 3, pp. 49-63.*
Flatt "Composable and compilable macros:: you want it when?", Oct. 2002 ACM, pp. 72-83.*
"IBM Software Information Center; Embedded macros," Retrieved from the Internet: http://publib.boulder.ibm.com/infocenter/rb63help/index.jsp?topic=/com. ibm.redbrick.doc6.3/ssg/ssg84.htm, Retrieved on Oct. 10, 2005, 2 pgs.
"What's New in Vox Proxy Version 3; Embedded Macros," Retrieved from the Internet: http://www.voxproxy.com/v3new.htm, Retrieved on Oct. 10, 2000, 4 pgs.
"Safe Macros Guidelines," Retrieved from the Internet: http://frontier.userland.com/stories/storyReader$2415, Retrieved on Oct. 10, 2005, 3 pgs.
"Understanding Macro Security Levels in Office; Programming-related security issues," Retrieved from the Internet: http://office.microsoft.com/en-us/assistance/HA011403181033.aspx, Retrieved on Oct. 10, 2005, 4 pgs.

* cited by examiner

*Primary Examiner*—Anna Deng
(74) *Attorney, Agent, or Firm*—Merchant & Gould; Ryan T. Grace

(57) ABSTRACT

An embedded macro establishes logic for object properties that define actions that execute when an event triggers. When an embedded macro is associated with an event, a regular event property value is set to an empty string and a shadow property associated with the regular event property is created. An application that supports embedded macros recognizes the empty regular property value as an indicator that a macro is embedded in the event. A binary representation of the macro is accessed from the shadow property and is executed when the event associated with the embedded macro triggers. An action safe list identifies trusted embedded macro actions. Embedded macro actions not included on the safe list are not executed such that untrusted actions are blocked from execution.

19 Claims, 7 Drawing Sheets

EMBEDDED MACROS

BACKGROUND

Software operations within a computer system may be simplified through the use of macros. A macro can be used to automate a task that is performed repeatedly or on a regular basis. A macro is a series of commands and actions that may be executed when the task is to be performed. Tasks performed by macros are typically repetitive in nature allowing significant savings in time by executing the macro instead of manually repeating the commands. A macro may be associated with an event (e.g., a click event of a button, an open event of a form). When an object (e.g., a button, a form) associated with the macro is copied to another location within an application, the macro remains associated with both the old object and the copied object. Thus, any modification to the macro affects both objects. Furthermore, the macro may be associated with a database that is disabled which limits the functions that may be performed by the macro.

SUMMARY

An embedded macro is a macro that is stored with an event. The embedded macro establishes logic for object properties that are used to define actions that execute when the event occurs. When an embedded macro is created, a regular event property value is set to indicate the existence of a shadow property associated with the regular event property. The shadow property includes a binary representation of the macro. The binary representation of the macro is accessed from the shadow property and executed by a macro engine when the event triggers in an application that supports embedded macros.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
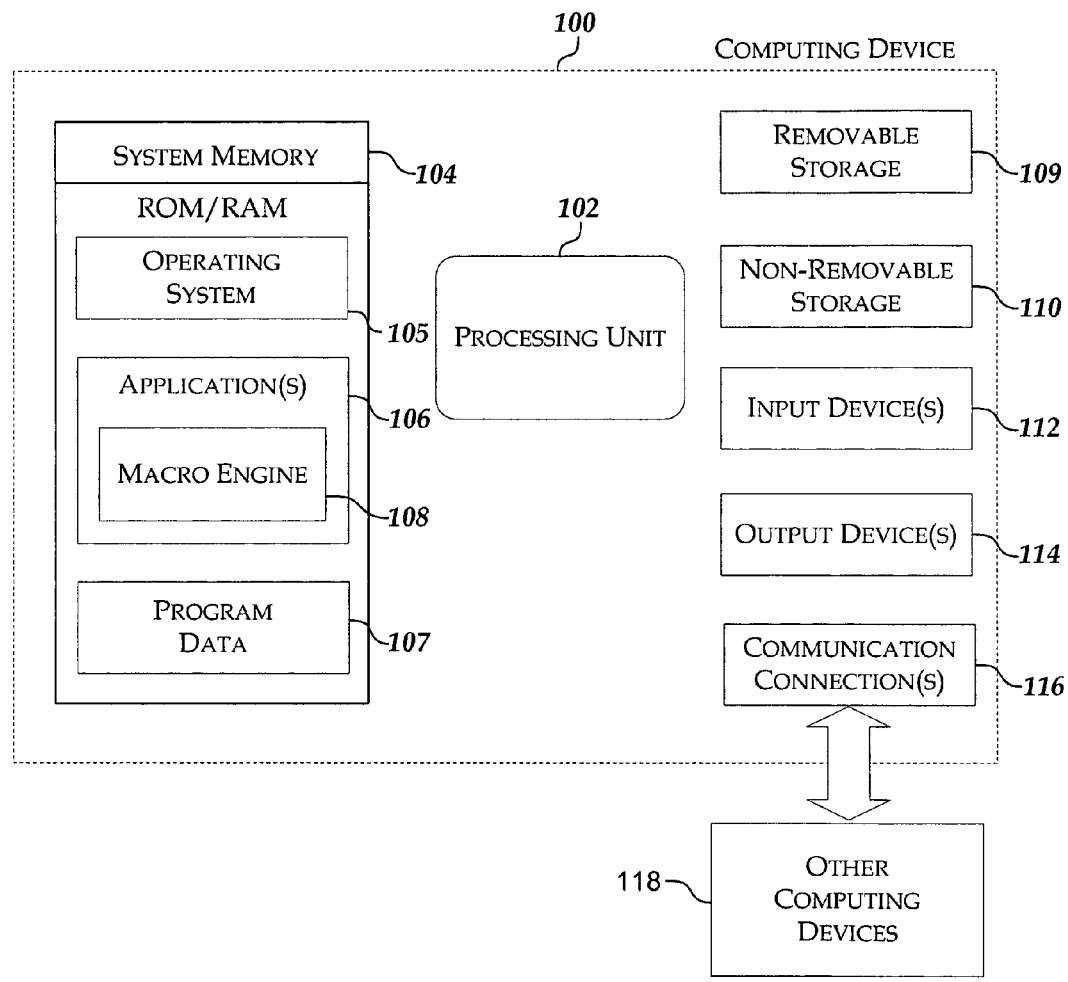
FIG. 1 illustrates a computing device in which embedded macros may be implemented.

Referring to FIG. 1, an exemplary system for implementing an application that supports embedded macros includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include macro engine 108 that is discussed in further detail below.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The present disclosure is not limited to the above-described environment, however. Many other configurations of computing devices, communications, applications, and distribution systems may be employed to implement a multi-dimensional calculation application that uses query scripts to optimize leaf-level calculations.

Embedded Macros

The present disclosure is described in the general context of computer-executable instructions or components, such as software modules, being executed on a computing device. Generally, software modules include routines, programs, objects, components, data structures, and the like that perform particular tasks or implement particular abstract data types. Although described here in terms of computer-executable instructions or components, the present disclosure may equally be implemented using programmatic mechanisms other than software, such as firmware or special purpose logic circuits.

Figure 2:
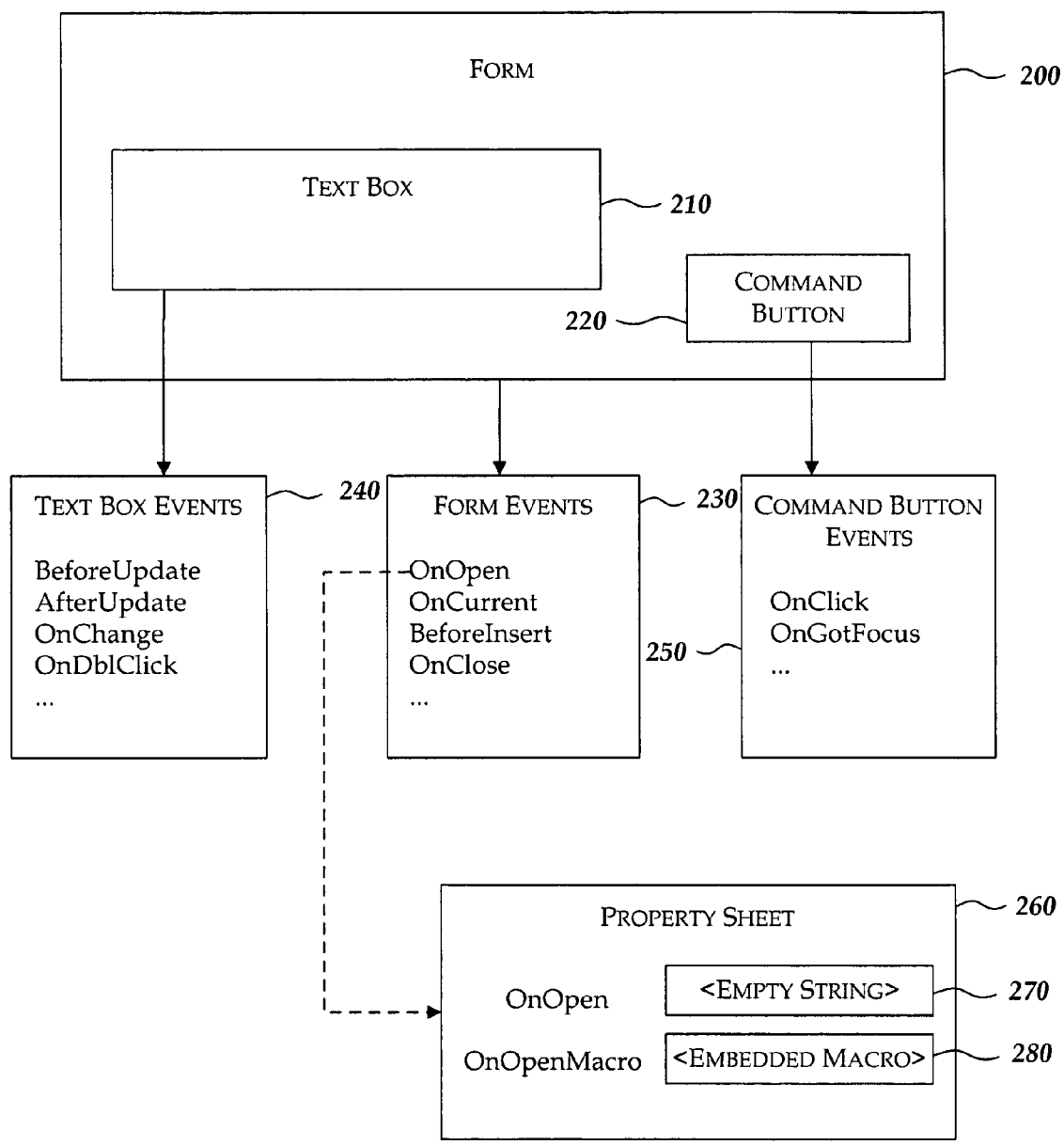
FIG. 2 is a conceptual diagram illustrating major functional blocks involved in evaluating an embedded macro.

FIG. 2 is a conceptual diagram illustrating major functional blocks involved in evaluating an embedded macro. An embedded macro is a macro that is stored with an event. An event may be a user action (e.g., clicking a mouse button, pressing a key) or a system occurrence (e.g., opening a form, running out of memory). Events are associated with objects such as tables, queries, forms, reports, text boxes, and controls. An embedded macro establishes logic for object properties that are used to define actions that execute when the event occurs.

Embedded macros are described with reference to form object 200, text box object 210, and command button 220 but it is understood that embedded macros may be used with any type of object. Form object 200 includes text box object 210 and command button object 220. Form object 200 may be associated with form events 230 (e.g., OnOpen, OnCurrent, BeforeInsert, OnClose, etc.). Text box object 210 may be associated with text box events 240 (e.g., BeforeUpdate, AfterUpdate, OnChange, OnDblClick, etc.). Command button object 220 may be associated with command button events 250 (e.g., OnClick, OnGotFocus, etc.).

Event properties may be defined on a property sheet. For example, properties associated with an OnOpen form event are defined on property sheet 260. The OnOpen event triggers when form 200 is opened. The event properties include regular property 270 and shadow property 280. Regular property 270 may be a text string value that identifies code, a macro, or an expression that executes code. Shadow property 280 is generated when a macro is embedded in the event. Shadow property 280 includes a binary representation of a macro. Shadow property 280 is identified to reflect regular property 270 in the object model. For example, the shadow property associated with the OnOpen event property is identified as OnOpenMacro. Regular property 270 is set to an empty string when shadow property 280 is generated.

According to one embodiment, an application that supports embedded macros recognizes the empty regular property value as an indicator that a macro is embedded with the event. The binary representation of the macro is then accessed from shadow property 280 and executed by a macro engine. For example, the application recognizes the empty regular property value when the OnOpen event triggers. The application then accesses and executes the OnOpenMacro. An application that does not support embedded macros recognizes the regular property value as empty but does not execute the embedded macro. If regular property 270 is modified after shadow property 280 is created, the embedded macro is ignored by the application and the regular property value is used when the event triggers.

Figure 3:
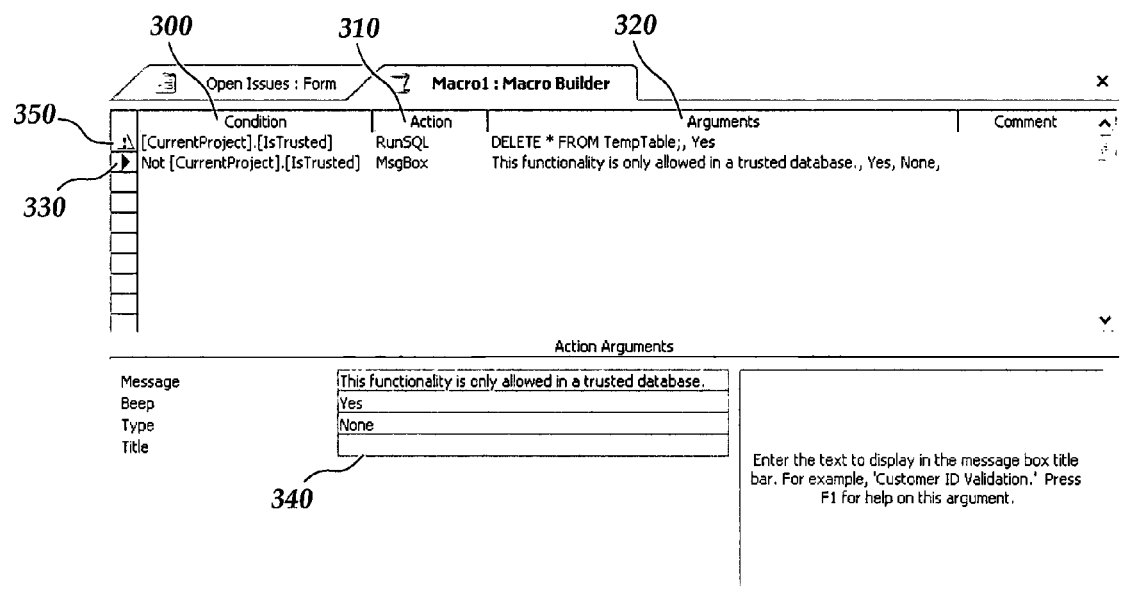
FIG. 3 is a conceptual diagram illustrating a macro builder user interface associated with an embedded macro.

FIG. 3 is a conceptual diagram illustrating a macro builder user interface associated with an embedded macro. An embedded macro may be created, accessed and edited using a macro builder. A macro includes a set of conditions 300, actions 310 and arguments 320. The action is executed when the corresponding condition is met. Arguments associated with an action may be edited when the action is selected on the user interface. For example, selection indicator 330 identifies that the MsgBox action is selected. Thus, arguments associated with the MsgBox may be edited as shown in argument edit box 340.

An embedded macro may be identified as safe or unsafe. A safe macro may be an embedded macro that has been identified as safe by a user or some other trusted authority or an embedded macro that has been retrieved from a trustworthy location. In one embodiment, actions in an embedded macro may include some actions that are identified as trusted and other actions that are identified as untrustworthy. Execution of the entire macro is not prevented just because the macro may include some untrustworthy actions. An action safe list identifies trusted actions. Actions not included on the safe list are not executed when the application is in a disabled mode such that untrusted actions are blocked from execution. For example, warning indicator 350 identifies the RunSQL action as blocked (i.e., not included on the safe list). Thus, the RunSQL action is not executed when the database is not trusted. The MsgBox action is safe to execute in any database.

The macro engine evaluates the first condition of the macro and then executes the action if the condition is true. As shown in the macro builder, the first condition of the embedded macro determines whether a solution [CurrentProject] is trusted. The RunSQL action is executed if the solution is trusted. The RunSQL action corresponds to execution of DELETE*FROM TempTable as identified in arguments 320. If the condition is not true, the RunSQL action is ignored. The macro engine then evaluates the next action. If [CurrentProject] is not a trusted solution, the MsgBox action is executed. Execution of the MsgBox action causes a message box to be displayed with the parameters identified in arguments 320.

Embedded macros support an automatic name correct function such that a name change made to an object is reflected in a corresponding embedded macro that references that object. An embedded macro may reference an object by the name of the object. The object may then be renamed. The embedded macro is automatically corrected to reference the renamed object. In one embodiment, global unique identifiers (GUIDs) associated with objects that are referenced in action arguments of the embedded macro are saved in a name map. When the embedded macro is loaded for execution a determination is made whether any properties fail to resolve to a valid object. The GUIDs corresponding to any invalid objects are retrieved from the name map. The name of the object in the macro is then automatically corrected to reference the renamed object associated with the corresponding GUID. The automatic name correct function is possible because the macro is embedded in an event associated with the object such that the macro is provided with context.

The present disclosure is not limited to the data structures, data types, hierarchies, naming conventions, and the like, discussed above. Other data structures, data types, hierarchies, naming conventions, and the like may be implemented using the principles described herein.

Figure 4:
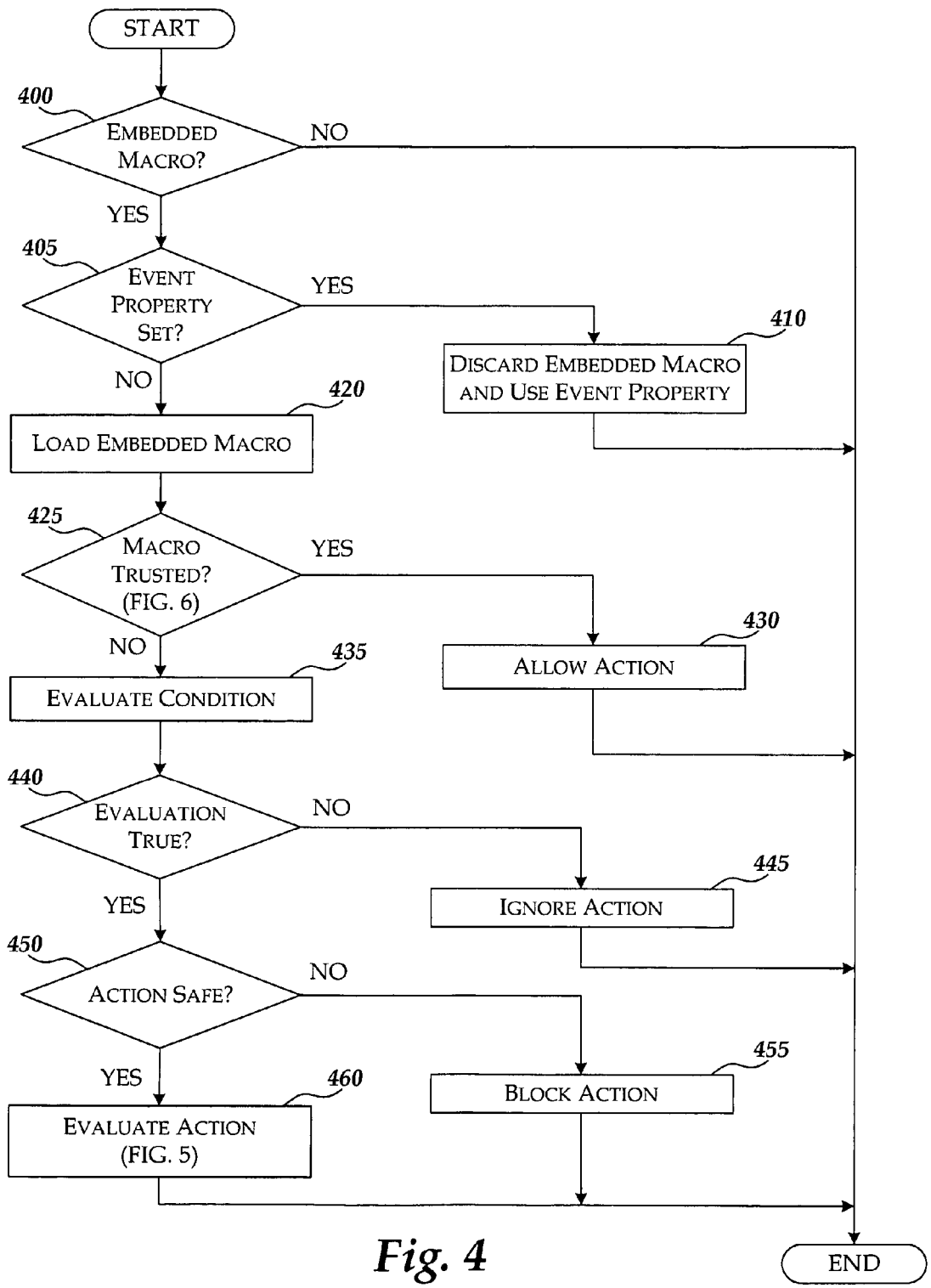
FIG. 4 illustrates a logic flow diagram for a process of evaluating an embedded macro.

FIG. 4 illustrates a logic flow diagram for a process of evaluating an embedded macro. An embedded macro is stored with an event that is associated with an object. The embedded macro establishes logic for properties that define actions that execute when the event occurs.

The process begins at decision operation 400 where a determination is made whether an object is associated with an embedded macro. The determination may be made by identifying a shadow property associated with the event. An application that does not support embedded macros does not recognize the shadow property. If the object is not associated with an embedded macro, processing terminates at an end operation. If the object is associated with an embedded macro, processing continues at decision operation 405.

Moving to decision operation 405, a determination is made whether a regular event property is set to a value other than an empty string. The regular event property may have been provided with a value by an application that does not support embedded macros. For example, the set value may correspond to a stand alone macro rather than an embedded macro. If the regular event property is set, processing continues to operation 410 where the embedded macro is discarded and an action is executed using the set property value. Processing then terminates at the end operation. If the regular event property is an empty string, processing continues to operation 420 where the embedded macro is loaded in a macro engine for evaluation.

Continuing to decision operation 425, a determination is made whether the embedded macro is a trusted macro. The process for determining whether a macro is trusted in described in detail below with reference to FIG. 6. If the macro is trusted, the actions in the embedded macro may be safely executed at operation 430. Processing then terminates at the end operation. If the macro is untrustworthy, processing moves to operation 435 where a condition associated with an action in the macro is evaluated.

Moving to decision operation 440, a determination is made whether the condition evaluation is true. If the condition evaluates to false, processing moves to operation 445 where the action is ignored. Processing then terminates at the end operation. If the condition evaluates to true, processing moves to decision operation 450 where a determination is made whether the action is included on a safe list. If the action is not included on the safe list, processing moves to operation 455 where the action is blocked. When the action is blocked a dialog is presented to the user that identifies the solution as untrusted and the macro action is not executed. In one embodiment, an error identifying the blocked action is generated and processed by the macro engine. Processing then terminates at the end operation. If the action is included on the safe list, processing moves to operation 460 where the action is evaluated to determine whether to block or allow the action as described in reference to FIG. 5.

Figure 5:
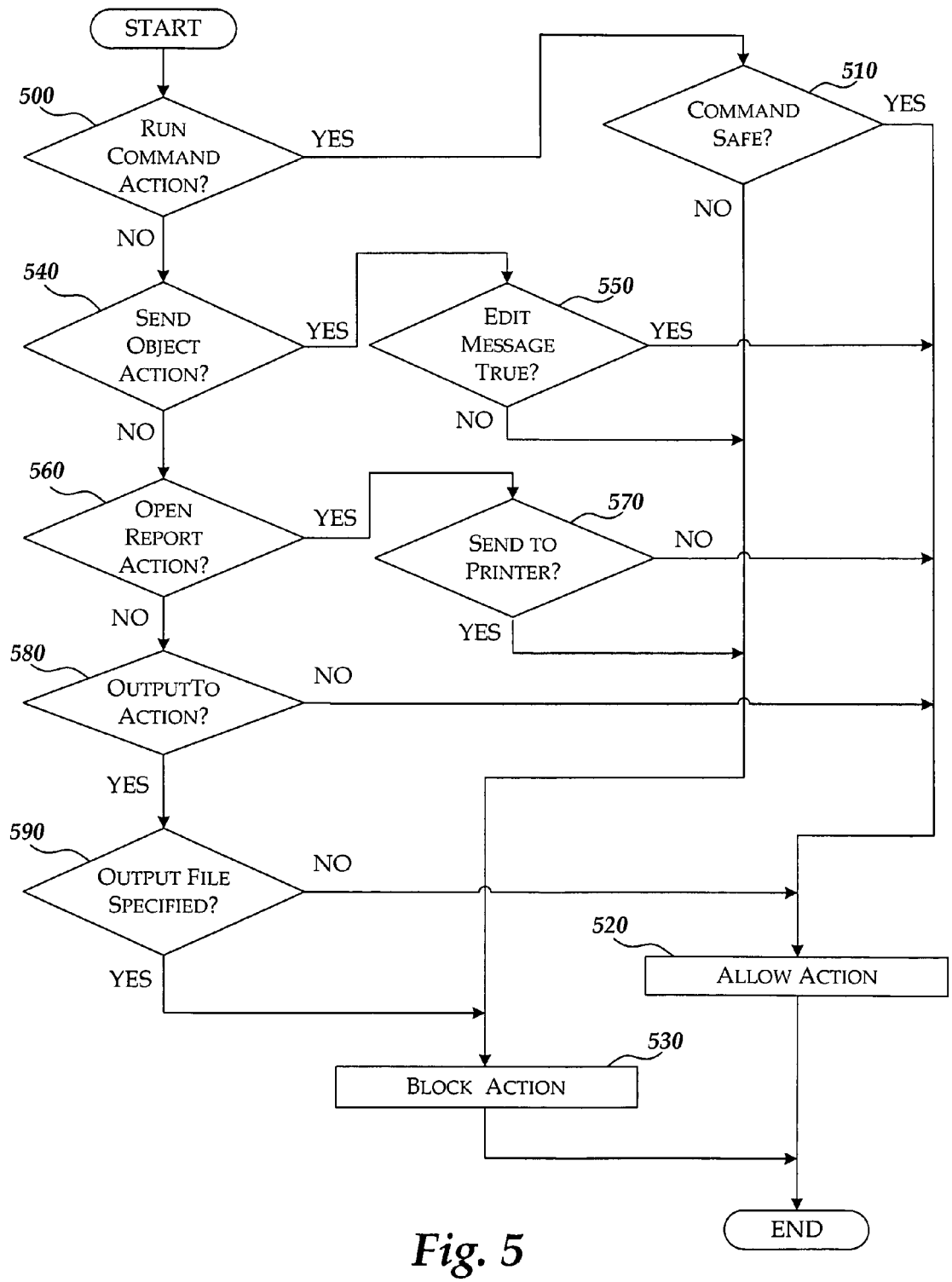
FIG. 5 illustrates a logic flow diagram for a process of evaluating a macro action included on a safe list.

FIG. 5 illustrates a logic flow diagram for a process of evaluating a macro action included on a safe list. Most types of actions are assumed to be safe by virtue of the fact that they are included in the safe list. Some types of actions on a safe list require a special evaluation to determine whether the action is safe. Examples of actions that require a special evaluation include run command actions, send object actions, open report actions, and OutputTo actions.

A determination is made at decision operation 500 whether the action is a run command action. If the action is a run command, processing moves to decision operation 510 where a determination is made whether the command is safe. If the command is safe, the action is allowed at operation 520. If the command is not safe, the action is blocked at operation 530.

If the action is not a run command, processing moves to decision operation 510 where a determination is made whether the action is a send object action. A send object action may attach an object to an email message. For example, a send object action may attach a report to an email message and then send the email with the attachment to a designated recipient. If the action is a send object action, processing moves to decision operation 550 where a determination is made whether an edit message condition associated with the send object action evaluates as true. An argument associated with the send object action determines whether the email is sent directly or the email application is opened to allow user modifications before sending the email (e.g., include a message, add more recipients, modify the subject line, etc.). If the edit massage condition evaluates as true, processing continues to operation 520 where the action is allowed such that the email is created. If the edit massage condition evaluates as false, processing continues to operation 530 where the action is blocked. The email application may require user input before the message can be sent.

Moving to decision operation 560, a determination is made whether the action is an open report action. An open report action may cause a report object to be opened and automatically forwarded to a printer. A user may determine the view that the report opens in. If the action is an open report action, processing moves to decision operation 570 where a determination is made whether an argument has been set to automatically print the report. If the argument is not set to automatically print, processing moves to operation 520 where the action is allowed and the report is opened but not printed. If the argument is set to automatically print, processing moves to operation 530 where the action is blocked.

Proceeding to decision operation 580, a determination is made whether the action is an OutputTo action. An OuputTo action causes an object to be exported to a specified destination. For example, a query object may be exported to a specified application. If the action is not an OutputTo action, processing moves to operation 520 where the action is allowed. The action is assumed to be safe because the action is included in the safe list and is not a special action that requires additional evaluation. If the action is an OutputTo action, processing moves to decision operation 590 where a determination is made whether an output file is specified for the object exported by the OutputTo action. If an output file is not specified, processing moves to operation 520 where the action is allowed such that the user is prompted for the location where the object is to be exported. If an output file is specified, processing moves to operation 530 where the action is blocked. In one embodiment, the action is allowed after the user identifies an output file. It is understood that the safe list actions requiring additional evaluation may be expanded beyond the four actions described above.

Figure 6:
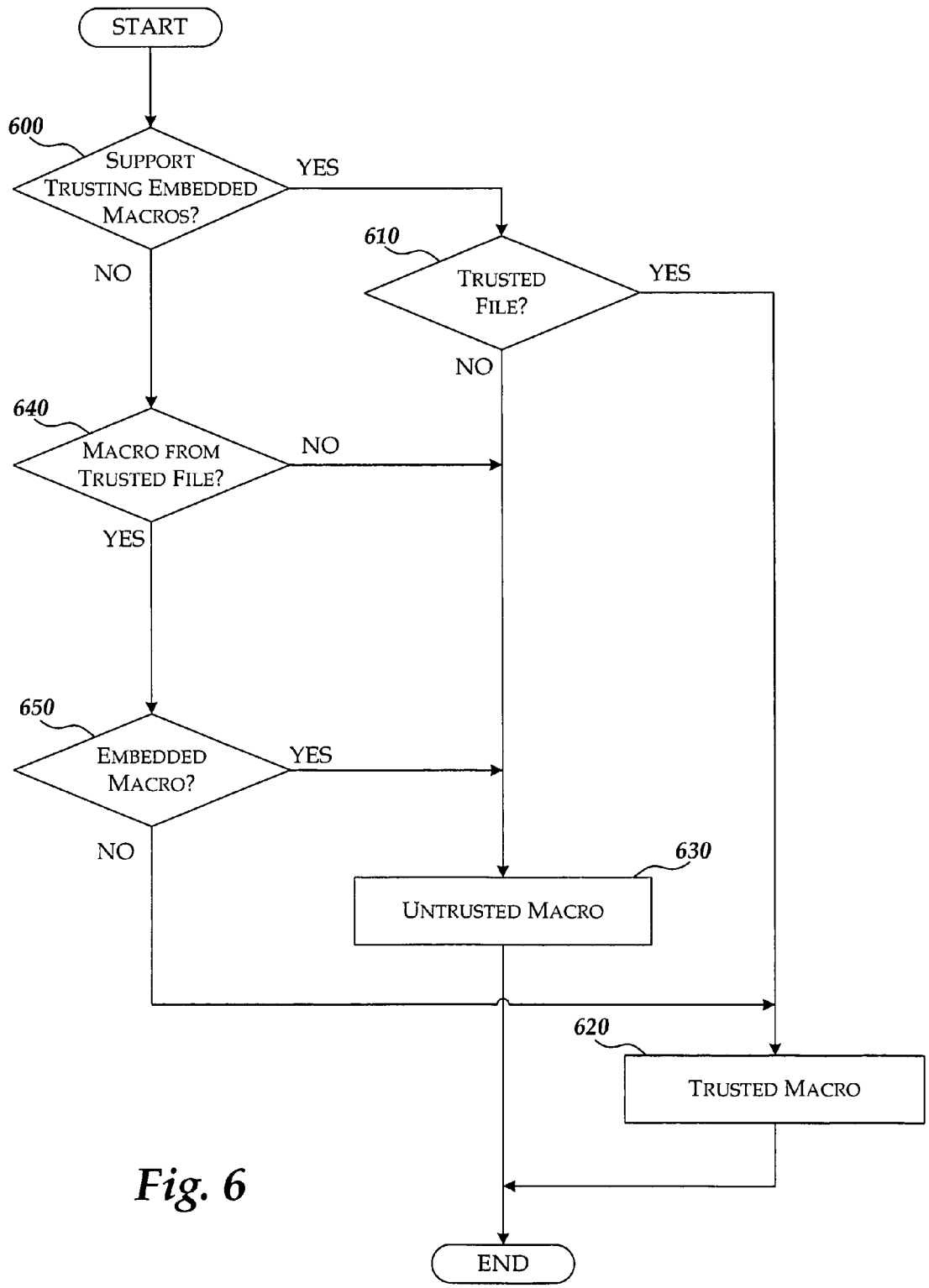
FIG. 6 illustrates a logic flow diagram for a process of determining whether an embedded macro is trusted.

FIG. 6 illustrates a logic flow diagram for a process of determining whether a macro is trusted. An event may trigger a file to open that does not support trusting embedded macros. A determination is made at decision operation 600 whether the file supports trusting embedded macros. In one embodiment, the determination is made based on a digital signature in the file. In another embodiment, the determination is made based on file location. If the file supports trusting embedded macros, processing moves to decision operation 610 where a determination is made whether the file is trusted. If the file is trusted, processing moves to operation 620 where the macro is identified as trusted. If the file is not trusted, processing moves to operation 630 where the macro is identified as untrusted.

Moving to decision operation 640, a determination is made whether the file that contains the macro is trusted. If the file is not trusted, processing moves to operation 630 where the macro is identified as untrusted. If the file is trusted, processing moves to decision operation 650 where a determination is made whether the macro from the trusted file is an embedded macro. If the macro is an embedded macro, processing moves to operation 630 where the macro is identified as untrusted. If the macro is not an embedded macro (e.g., the file references a stand alone macro), processing moves to operation 620 where the macro is identified as trusted.

Figure 7:
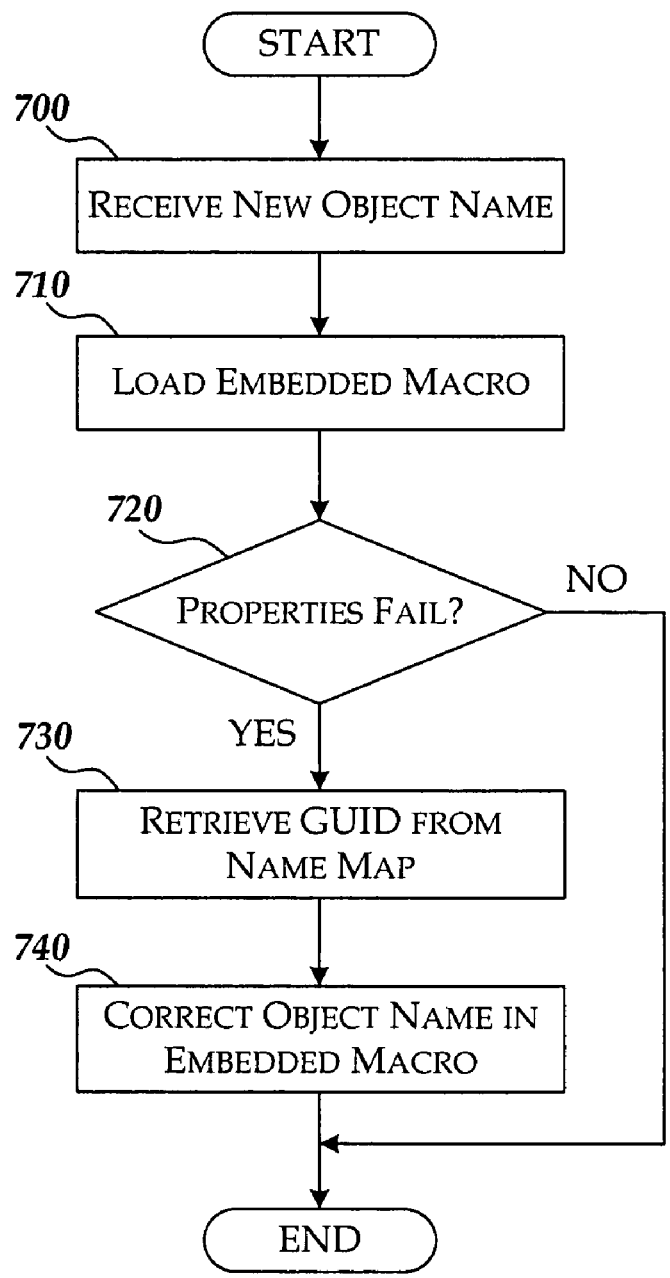
FIG. 7 illustrates a logic flow diagram for a process of automatically correcting a name of an object that is referenced in an embedded macro.

FIG. 7 illustrates a logic flow diagram for a process of automatically correcting a name of an object that is referenced in an embedded macro after the object is renamed. Processing begins at a start operation where an embedded macro references an object by the name of the object. A GUID for each object referenced in the embedded macro is saved in a name map. A user may rename the object such that the new name of the object is received at operation 700.

Moving to operation 710, the embedded macro is loaded for execution. Transitioning to decision operation 720, a determination is made whether any properties fail to resolve to a valid object. A property may fail to resolve to a valid object if the object name has been changed. If all embedded macro properties resolve to valid objects, processing terminates at an end operation. If at least one property fails to resolve to a valid object, processing continues to operation 730.

Proceeding to operation 730, a GUID corresponding to the invalid object is referenced in the name map such that the new name of the object may be determined. Continuing to operation 740, the name of the object in the embedded macro property is corrected to reference the renamed object. Processing then terminates at the end operation. The automatic name correct function is possible because the macro is embedded in an event associated with the object such that the macro is provided with context.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for evaluating a macro, comprising:
    providing a form having at least one object, wherein the at least one object includes a pregenerated event to cause an execution of the macro upon receiving a trigger to the pregenerated event;
    receiving the trigger to the pregenerated event;
    upon receiving the trigger of the pregenerated event, accessing a property sheet stored with the pregenerated event, wherein the property sheet includes a regular property field and a shadow property field;
    when the regular property field includes a value, executing the macro via the value in the regular property field of the property sheet; and
    when the regular property field includes an empty string, determining that the macro is a macro embedded in the pregenerated event and accessing a binary representation of the embedded macro in the shadow property field of the property sheet to cause a processor to load the embedded macro for evaluation.

2. The computer-implemented method of claim 1, further comprising causing a macro engine to evaluate the embedded macro prior to execution of the embedded macro.

3. The computer-implemented method of claim 2, wherein evaluating the embedded macro includes identifying trusted actions, wherein the trusted actions are executed.

4. The computer implemented method of claim 2, wherein evaluating the embedded macro includes identifying untrusted actions, wherein untrusted actions are evaluated to determine whether the untrusted action is safe by accessing a safe list.

5. The computer-implemented method of claim 4, wherein an identified untrusted action is a run command action, wherein the run command action is blocked when the run command action is determined unsafe.

6. The computer-implemented method of claim 4, wherein an identified untrusted action is a send object action, wherein the send object action is blocked when the send object action is determined unsafe.

7. The computer-implemented method of claim 4, wherein an identified untrusted action is an open report action, wherein the open report action is blocked when the open report action is determined unsafe.

8. The computer-implemented method of claim 4, wherein an identified untrusted action is an OutputTo action, wherein the OutputTo action is blocked when the OutputTo action is determined unsafe.

9. The computer-implemented method of claim 4, wherein an identified untrusted action is an output file specified action, wherein the output file specified action is blocked when the output specified action is determined unsafe.

10. A computer-readable storage medium having computer executable instructions for evaluating a macro, comprising:
    providing at least one object, wherein the at least one object includes an event to cause an execution of the macro upon receiving a trigger to the event;
    receiving the trigger to the event;
    upon receiving the trigger of the event, accessing a property sheet stored with the event, wherein the property sheet includes a regular property field and a shadow property field;
    when the regular property field includes a value, executing the macro via the value in the regular property field of the property sheet; and
    when the regular property field includes an empty string, determining that the macro is a macro embedded in the pregenerated event and accessing a binary representation of the embedded macro in the shadow property field of the property sheet to cause a processor to load the embedded macro for evaluation.

11. The computer-readable storage medium of claim 10, further comprising causing a macro engine to evaluate the embedded macro prior to execution of the embedded macro.

12. The computer-readable storage medium of claim 11, wherein evaluating the embedded macro includes identifying trusted actions, wherein the trusted actions are executed.

13. The computer-readable storage medium of claim 11, wherein evaluating the embedded macro includes identifying untrusted actions, wherein untrusted actions are evaluated to determine whether the untrusted action is safe by accessing a safe list.

14. The computer-readable storage medium of claim 13, wherein an identified untrusted action is at least one member of a group comprising: a run command action, a send object action, an open report action, an OutputTo action, and an output file specified action.

15. A system for evaluating a macro, comprising:
a processor; and
a memory having computer executable instructions stored thereon, wherein the computer executable instructions are configured for:
providing at least one object, wherein the at least one object includes an event to cause an execution of the macro upon receiving a trigger to the event;
receiving the trigger to the event;
upon receiving the trigger of the event, accessing a property sheet stored with the event, wherein the property sheet includes a regular property field and a shadow property field;
when the regular property field includes a value, executing the macro via the value in the regular property field of the property sheet; and
when the regular property field includes an empty string, determining that the macro is a macro embedded in the pregenerated event and accessing a binary representation of the embedded macro in the shadow property field of the property sheet to cause a processor to load the embedded macro for evaluation.

16. The system of claim 15, further comprising causing a macro engine to evaluate the embedded macro prior to execution of the embedded macro.

17. The system of claim 16, wherein evaluating the embedded macro includes identifying trusted actions, wherein the trusted actions are executed.

18. The system of claim 16, wherein evaluating the embedded macro includes identifying untrusted actions, wherein untrusted actions are evaluated to determine whether the untrusted action is safe by accessing a safe list.

19. The system of claim 18, wherein an identified untrusted action is at least one member of a group comprising: a run command action, a send object action, an open report action, an OutputTo action, and an output file specified action.

* * * * *